US009609133B2

(12) United States Patent
Shaffer et al.

(10) Patent No.: US 9,609,133 B2
(45) Date of Patent: Mar. 28, 2017

(54) PREDICTIVE MODEL FOR ABANDONED CALLS

(71) Applicant: Avaya Inc., Santa Clara, CA (US)

(72) Inventors: Shmuel Shaffer, Palo Alto, CA (US); Patrick Tendick, Basking Ridge, NJ (US); Sheldon Davis, Guelph (CA); Wen-Hua Ju, Monmouth Junction, NJ (US)

(73) Assignee: Avaya Inc., Santa Clara, CA (US)

( * ) Notice: Subject to any disclaimer, the term of this patent is extended or adjusted under 35 U.S.C. 154(b) by 36 days.

(21) Appl. No.: 14/673,515

(22) Filed: Mar. 30, 2015

(65) Prior Publication Data

US 2016/0295020 A1    Oct. 6, 2016

(51) Int. Cl.
    *H04M 3/523*   (2006.01)
    *H04M 3/42*    (2006.01)

(52) U.S. Cl.
    CPC ..... *H04M 3/5235* (2013.01); *H04M 3/42068* (2013.01)

(58) Field of Classification Search
    CPC .................. H04M 3/5235; H04M 3/42068
    USPC .................. 379/265.01–265.09, 265.1–266.1
    See application file for complete search history.

(56) References Cited

U.S. PATENT DOCUMENTS

| 8,311,208 B2 | 11/2012 | Ibrahim et al. | |
| 8,675,857 B1* | 3/2014 | Croak | H04L 12/6418 |
| | | | 370/352 |
| 2006/0239442 A1* | 10/2006 | Shaffer | H04M 3/5232 |
| | | | 379/266.01 |
| 2010/0138037 A1* | 6/2010 | Adelberg | G06Q 10/087 |
| | | | 700/241 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |

OTHER PUBLICATIONS

Ghebali, "Real-Time Prediction of the Probability of Abandonment in Call Centers," retrieved from http://web.archive.org/web/20160204212402/http://iew3.technion.ac.il/serveng/References/Research%20Proposal_LAST_July_20.pdf, M.Sc. Research Proposal, 2011, 15 pages.
Duder, "Towards 'zero abandonments' in call center performance," European Journal of Operational Research, 2001, vol. 135(1), pp. 50-60, 1 page, abstract only.

* cited by examiner

*Primary Examiner* — Quynh Nguyen
(74) *Attorney, Agent, or Firm* — Sheridan Ross P.C.

(57) ABSTRACT

A predictive model for abandoned calls provided by a contact center communication system for routing optimization is described along with various methods and mechanisms for administering the same. Based on multiple attributes, the system can calculate the probabilities, risks, and costs associated with abandonment and wait, taking into account the patience of a caller, region where the caller lives, agents available to handle the call, length of time that the caller has already been waiting, potential cost of having the caller and call type abandon, and potential total cost of having the caller wait to be served.

20 Claims, 5 Drawing Sheets

| Contact | Region | Customer Class | Transaction Type | P( Wait > 5) | P( Wait <= 5) | P(Abandon) | Risk of Abandon ($) | Risk of Wait ($) | Total Risk ($) |
|---|---|---|---|---|---|---|---|---|---|
| 1 | West | Silver | Sales | 0.3 | 0.7 | 0.146 | 4.38 | 4.2 | 8.58 |
| 2 | Northeast | Gold | Sales | 0.3 | 0.7 | 0.45 | 45 | 1.5 | 46.5 |
| 3 | Southwest | Platinum | Sales | 0.3 | 0.7 | 0.239 | 71.7 | 13.5 | 85.2 |
| 4 | South | Gold | Support | 0.8 | 0.2 | 0.348 | 3.48 | 0 | 3.48 |
| 5 | Midwest | Silver | Support | 0.8 | 0.2 | 0.17 | 0 | 0 | 0 |

PREDICTIVE MODEL FOR ABANDONED CALLS

FIELD OF THE DISCLOSURE

The present disclosure is generally directed toward communications and more specifically toward contact centers.

BACKGROUND

An abandon rate is an important metric to a contact center since it measures how many calls are hang ups before being serviced. The abandon rate is typically calculated as a percentage of total inbound calls from customers where a customer hangs up prior to speaking to an agent. Wait times affect the abandon rate, as customers are more likely to abandon a call when a wait is too long. High abandon rates lead to customer dissatisfaction and loss of potential revenue.

To operate most efficiently, the contact center needs to use all of the information available when routing contacts to agents. In addition to matching a contact to the best possible agent based on the needs of the customer, the contact center should take into account how likely it is that the contact will abandon. However, the traditional abandon rate calculation has serious limitations. In current systems, abandon rates are calculated at a skill or queue level. However, with agent selection work assignment, the notion of a queue may not be useful for predicting wait time. For example, there may not be traditional skills with which calls and agents are associated, and call A may be handled before a different call B that entered the system earlier.

Calculated abandon rates are rates at which things have already happened. If the abandon rate is calculated right now, it applies to calls that entered the system at some time in the past and possibly at very different times. The calculated abandon rate does not tell how likely it is that a call that enters the system right now will abandon at some point in the future. The abandon rate also does not tell how likely it is that a call will abandon given that it has already been in the system for a certain amount of time.

If a communication system is to take potential abandonment into account when routing, the communication system needs to know how likely a customer is to abandon given that the customer has already been waiting for five minutes. Some customers are more patient than others. For example, it is well known that people in the Northeast United States are much less patient than people in the Midwest United States. In addition, the communication system may have past history for the customer that enables the communication system to predict the customer's patience.

Different calls have different costs associated with abandonment and with waiting. For example, having a sales call abandon may incur a much higher cost (lost revenue) than having a service call abandon. Also, even if a call does not abandon, there is a cost associated with making a caller wait, in terms of loss of good will.

SUMMARY

These and other needs are addressed by the various aspects, embodiments, and configurations of the present disclosure. The present disclosure is directed to a mechanism and an apparatus that provide a predictive model for abandoned calls and a method for interventional routing. Based on attributes, models for waiting, models for abandoning, and cost, the system is operable to provide predictions for the probability of abandon, the risk of abandon (expected cost), the risk of wait, and the total risk. Based on multiple attributes, the system calculates the probabilities and risks associated with abandonment and wait, taking into account the patience of the specific caller, the agents available to handle the call, the length of time that the caller has already been waiting, the potential cost of having the specific caller and call type abandon, and the potential cost of having the specific caller wait to be served. More specifically, the mechanism and apparatus for the predictive model for abandoned calls employs predictive models that seek to maximize the accuracy of the predictions and allow for adjustments to routing and assignment algorithms. The predictions may be used by a work assignment system to meet cost, routing, metrics, thresholds, and customer satisfaction goals. Additional variables may be considered within the probability predictions as contact centers evolve.

In some embodiments, the predictive model for abandoned calls is operable to predict how likely a caller is to abandon or wait more than a certain length of time, and also to calculate risk (expected cost to the business) associated with abandons and waiting, all based on the analysis of the attributes collected and the calculated probabilities and risks. The probabilities and risks can be calculated throughout the contact's time while waiting in queue or on hold, taking into account how long the caller has already been waiting. The predictions can be used to assign the contact to an agent, alter the wait treatment, and/or offer callback at a later time.

In non-limiting examples, the contact center may employ one of several models to calculate risk, including but not limited to:
  (a) The probability of abandon when the wait is more than five minutes (patience) or equal to or less than five minutes can be predicted by knowing the geographical region.
  (b) The probability of waiting more than five minutes can be predicted from transaction type.
  (c) The cost of abandon and wait can be predicted by the customer class, region, and transaction type.

The probabilities and costs may be used by the communication system to change routing or provide other intervening actions. These and other advantages will be apparent from the disclosure.

In some embodiments, a method is provided that generally comprises:
receiving a work item in a contact center, the work item being associated with a first customer and corresponding to a contact in the contact center to be processed by a contact center agent;
determining a wait tolerance of the work item, wherein the determined wait tolerance is based, at least in part, on at least one of a customer history for the first customer and a skill type for the work item;
determining an amount of time that the first customer has been waiting for service by the contact center;
based on a comparison of the determined wait tolerance and the determined amount of time that the first customer has been waiting for service by the contact center, determining a risk of the first customer abandoning the contact; and
based on the determined risk, determining whether to keep the work item in a current queue or route the work item to an agent out of a queue order in an attempt to avoid the first customer abandoning the contact.

The term "automatic" and variations thereof, as used herein, refers to any process or operation done without material human input when the process or operation is performed. However, a process or operation can be automatic, even though performance of the process or operation uses material or immaterial human input, if input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "customer" or "client" denotes a party patronizing, serviced by, or otherwise doing business with a contact center, business, or enterprise.

The phrase "Customer Relationship Management" or "CRM" as used herein refers to a software system that is operable to manage customer interactions, including the synchronization of data that is made available for use by technical support, customer service, sales, and marketing.

The phrase "context store" as used herein refers to software operable to collect, analyze, store, and provide inter-related information for customer interactions, including key-value pairs for customer contacts. The context store can store, retrieve, and share contextual information about previous and current customer interactions.

The phrase "Interactive Voice Response" or "IVR" as used herein refers to software or hardware that allows a computer-human interaction through the use of voice including automatic speech recognition (ASR) and DTMF tones input.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
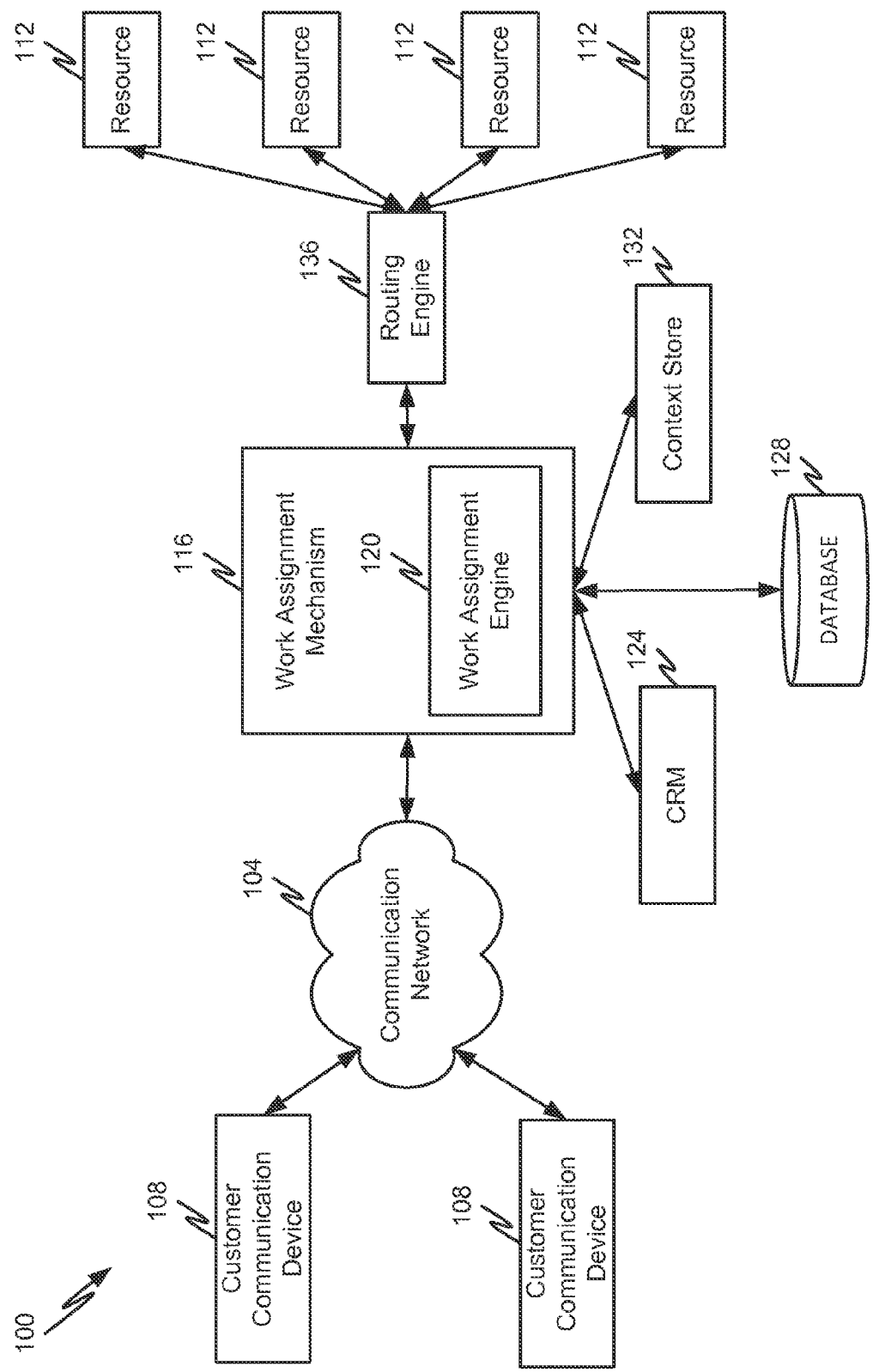
FIG. 1 is a block diagram of a communication system in accordance with embodiments of the present disclosure.

FIG. 1 depicts a communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Patent Publication No. 2010/0296417, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. Patent Publication Nos. 2010/0235218, 2011/0125826, and 2011/0125793, each of which are hereby incorporated herein by reference in their entirety.

The work assignment mechanism 116 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 136 to connect the communication device 108 to the assigned resource 112.

Although the routing engine 136 is depicted as being separate from the work assignment mechanism 116, the routing engine 136 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, cellular phone, smartphone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item can be sent toward a collection of processing resources 112 via the combined efforts of the work assignment mechanism 116 and routing engine 136. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112a-n connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 may be configured to administer and make work assignment decisions in a queueless contact center, as is described in U.S. Patent Publication No. 2011/0255683, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (i.e., determine optimal assignment of a work item resource to a resource). In some embodiments, the work assignment engine 120 can be configured to achieve true one-to-one matching by utilizing bitmaps/tables and other data structures.

A Customer Relationship Management System (CRM) 124 is operable to manage a variety of customer interactions, including the synchronization of data that is made available for use by technical support, customer service, sales, and marketing. The CRM 124 system can track, record, and store data in a database 128 and can mine the data to codify the interactions between a company and its customers. Analytics and key performance indicators (KPIs) may typically be used to focus marketing, to maximize revenue, and to increase customer satisfaction. The CRM 124 may communicate with the work assignment mechanism 116, the work assignment engine 120, the context store 132, the routing engine 136, and other network elements in and connected to the communication system 100.

A context store 132 may comprise software operable to collect, analyze, store, and provide information, including key-value pairs for customer contacts. The context store 132 can provide a centralized, scalable and low latency in-memory data cache for applications to store, retrieve, and share contextual information about customer interactions. An application that populates the context store 132 may capture transaction type and customer identifier and pair the data with customer geographic and demographic information from the CRM 124. Data from KPIs (e.g., Estimated Wait Time, or EWT) may also be populated, analyzed, and stored in the context store 132 and shared with and/or accessed by applications connected to the communications system 100.

In accordance with at least some embodiments of the present disclosure, elements of the communication system 100 may communicate with a database 128 that can include information regarding internal resources 112 and/or customers, customer accounts, and customer communication devices 108. Specifically, the database 128 may comprise information that identifies customers, their history and previous interactions, order status, communication permissions, CRM information, context store data, etc. The database 128 may be any type of data storage system and may include one or more hierarchical databases, relational databases, or any other type of known database structure such as a SQL database. The database 128, although depicted as being separate from other network elements, may comprise the data from the CRM 124, the context store 132, and other servers and applications and may be accessible to the work assignment mechanism 116, work assignment engine 120, routing engine 136, and other network elements via a database lookup or query/response protocol.

Figure 2:
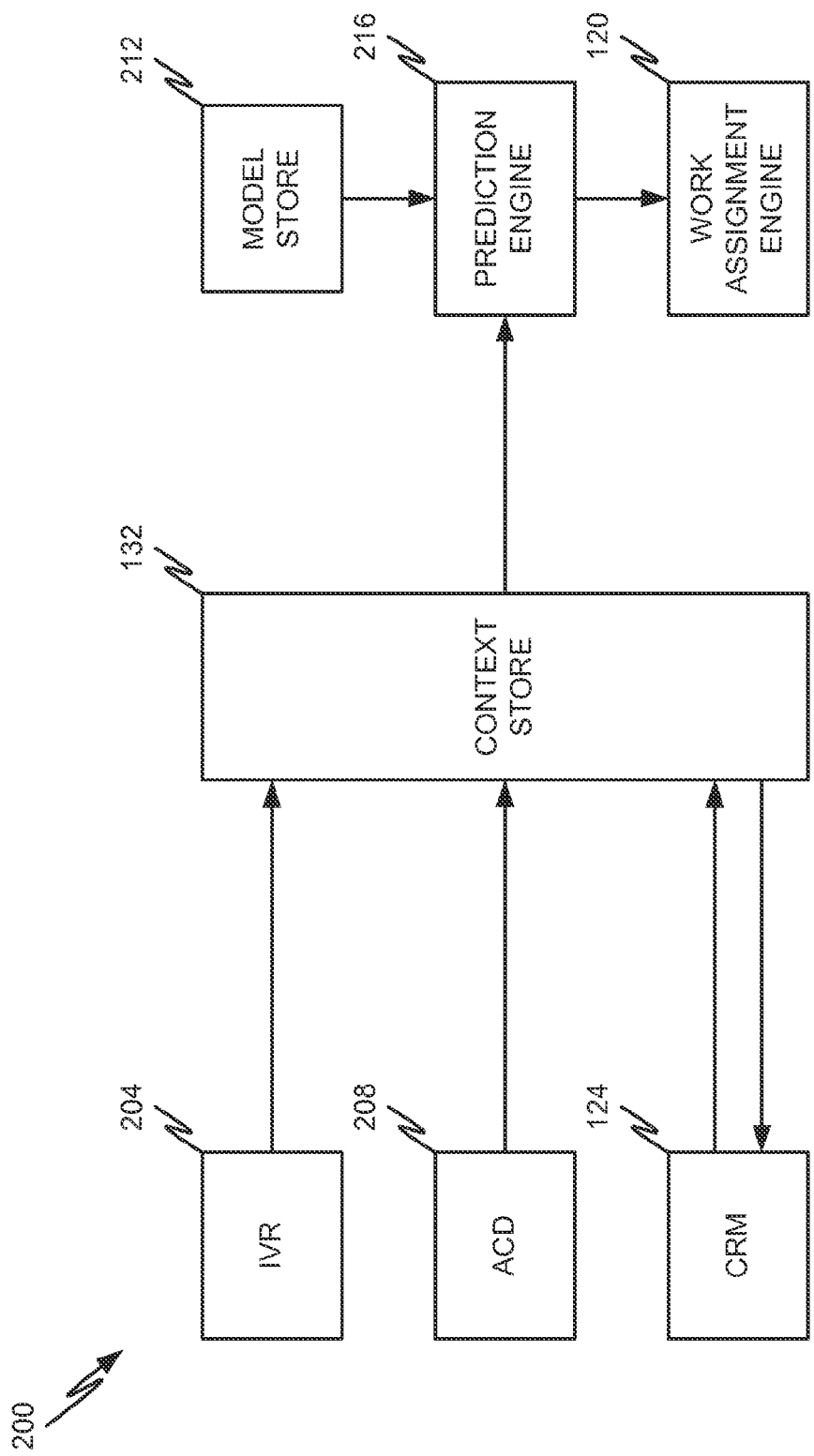
FIG. 2 is a block diagram for a mechanism and apparatus that provide a predictive model for abandoned calls in accordance with embodiments of the present disclosure.

FIG. 2 is a block diagram containing elements of a predictive model process for abandoned calls 200. A prediction model may be invoked that takes into account attributes including, but not limited to region, customer class, transaction type, risk of abandon, risk of wait, and cost of total risk. The predictive model for abandoned calls 200 may work by calculating risk, cost, and providing intervening actions when needed.

A non-limiting example of a process for calculating predictions used to compute business risk is shown in FIG. 2. The risk and its constituent predictions may be calculated by the prediction engine 216, which can contain the logic used to calculate predictive values but typically will not store the models or the predictor (input) variables. The models, which may have previously been estimated offline, may be stored in a model store 212, which can store models in a form usable by the prediction engine 216. The models may be stored in Predictive Model Markup Language (PMML) or other appropriate language and can be fed to the prediction engine 216 as needed. The predictor variables may be provided by a context store 132, which can store key-value pairs for each contact. For a given contact, an Interactive Voice Response (IVR) 204 may determine a transaction type and a customer identifier. The IVR 204 can capture data and may populate the database 128, the context store 132, or both. The IVR 204 may also use the customer identifier to retrieve customer geographic and demographic information from a Customer Relationship Management (CRM) 124. An Automatic Call Distribution (ACD) 208 can be queried to obtain a skill to which the contact has been queued which may also correspond to customer class (Silver, Gold, Platinum). Periodically, Estimated Wait Time (EWT) can be retrieved from the ACD 208 and populated/updated in the database 128, the context store 132, or both. When a consuming application, in this case a work assignment engine 120, needs to know the estimated risk of abandon and wait, the work assignment engine 120 may call the prediction engine 216 to calculate the risk. The model for risk may reference other models from the model store 212. The prediction engine 216 also may retrieve relevant data from the database 128, the context store 132, or both as needed.

Figure 3:
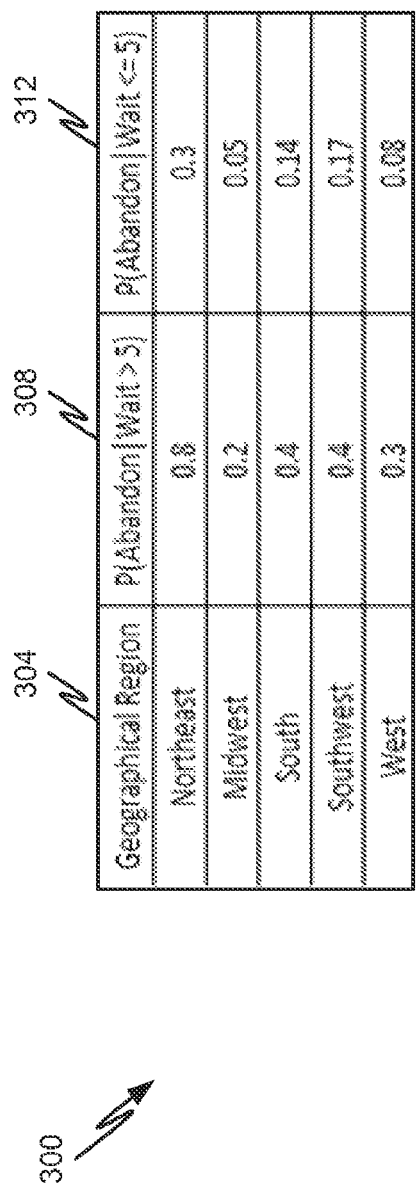
FIG. 3 is a table for abandon tolerance by region in accordance with embodiments of the present disclosure.

With reference now to FIG. 3, a table for abandon tolerance by geographical region 300 is presented in accordance with embodiments of the present disclosure. FIG. 3 contains a first column Geographical Region 304, a second column Probability of Abandon when a wait is greater than five minutes P(Abandon|Wait>5) 308, and a third column Probability of Abandon when a wait is less than or equal to five minutes P(Abandon|Wait≤5). Probabilities in the chart are only representative examples of regional differences, regions may vary, and the tolerances by region may vary.

Geographical Region 304 may include major regions of the United States, including, but not limited to, the Northeast, Midwest, South, Southwest, and West. Using historical data, predictions, and/or estimates from other data, probabilities can be determined by region for likelihood of abandon greater than five minutes and for likelihood of abandon for less than or equal to five minutes.

For the Northeast, P(Abandon|Wait>5) 308 may be 0.80, or 80% likely to abandon after five minutes. For the Midwest, P(Abandon|Wait>5) 308 may be 0.20, or 20% likely to abandon after five minutes. For the South, P(Abandon|Wait>5) 308 may be 0.40, or 40% likely to abandon after five minutes. For the Southwest, P(Abandon|Wait>5) 308 may be 0.40, or 40% likely to abandon after five minutes. For the West, P(Abandon|Wait>5) 308 may be 0.30, or 30% likely to abandon after five minutes. The probability of abandon after five minutes may vary by region, with the Northeast the most likely to abandon and the Midwest the least likely to abandon.

For the Northeast, P(Abandon|Wait≤5) 312 may be 0.30, or 30% likely to abandon at or prior to five minutes. For the Midwest, P(Abandon|Wait≤5) 312 may be 0.05, or 5% likely to abandon at or prior to five minutes. For the South, P(Abandon|Wait≤5) 312 may be 0.14, or 14% likely to abandon at or prior to five minutes. For the Southwest, P(Abandon|Wait≤5) 312 may be 0.17, or 17% likely to abandon at or prior to five minutes. For the West, P(Abandon|Wait≤5) 312 may be 0.08, or 8% likely to abandon at or prior to five minutes. The probability of abandon at or prior to five minutes may typically be less than at a time greater than five minutes and can also vary differently by region, with the Northeast the most likely of the regions to abandon and the Southwest the least likely to abandon.

Figure 4:
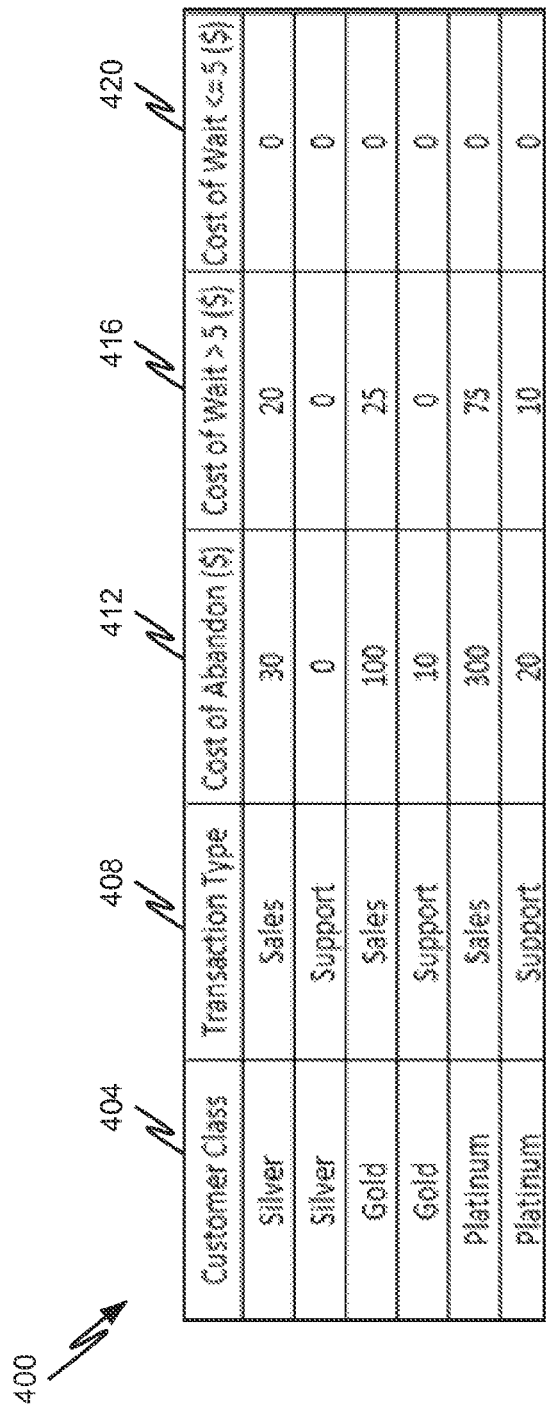
FIG. 4 is a table for cost of waiting by transaction type in accordance with embodiments of the present disclosure.

With reference now to FIG. 4, a table for determining cost of waiting by transaction type 400 is presented in accordance with embodiments of the present disclosure. FIG. 4 contains a first column Customer Class 404, a second column Transaction Type 408, a third column Cost of Abandon ($) 412, a fourth column Cost of Wait>5 ($) 416, and a fifth column Cost of Wait≤5 ($) 420.

Customer Class 404 may include tiers like Silver, Gold, and Platinum based on history of amount spent, contract, or visibility. Each Customer Class 404 may have multiple Transaction Types 408. In non-limiting examples, Customer Class 404 Silver may have Transaction Type 408 Sales and Transaction Type 408 Support. Customer Class 404 Gold may have Transaction Type 408 Sales and Transaction Type 408 Support. Customer Class 404 Platinum may have Transaction Type 408 Sales and Transaction Type 408 Support.

For each Customer Class 404 and Transaction Type 408, there may be a Cost of Abandon ($) 412, a Cost of Wait>5 ($) 416, and a Cost of Wait≤5 ($) 420. Using historical data, predictions, and/or estimates from other data, costs may be assigned to each category. In non-limiting examples, for Customer Class 404 Silver and Transaction Type 408 Sales, the Cost of Abandon ($) 412 may be $30, the Cost of Wait>5 ($) 416 may be $20, and the Cost of Wait≤5 ($) 420 may be $0 (no cost). For Customer Class 404 Silver and Transaction Type 408 Support, the Cost of Abandon ($) 412 may be $0 (no cost), the Cost of Wait>5 ($) 416 may be $0 (no cost), and the Cost of Wait≤5 ($) 420 may be $0 (no cost). For Customer Class 404 Gold and Transaction Type 408 Sales, the Cost of Abandon ($) 412 may be $100, the Cost of Wait>5 ($) 416 may be $25, and the Cost of Wait≤5 ($) 420 may be $0 (no cost). For Customer Class 404 Gold and Transaction Type 408 Support, the Cost of Abandon ($) 412 may be $10, the Cost of Wait>5 ($) 416 may be $0 (no cost), and the Cost of Wait≤5 ($) 420 may be $0 (no cost). For Customer Class 404 Platinum and Transaction Type 408 Sales, the Cost of Abandon ($) 412 may be $300, the Cost of Wait>5 ($) 416 may be $75, and the Cost of Wait≤5 ($) 420 may be $0 (no cost). For Customer Class 404 Platinum and Transaction Type 408 Support, the Cost of Abandon ($) 412 may be $20, the Cost of Wait>5 ($) 416 may be $10, and the Cost of Wait≤5 ($) 420 may be $0 (no cost). The cost of a call abandon typically will be higher for sales than for support, and the cost increases as the table moves from Silver to Platinum customer classes. Costs will vary based on customer classes and levels, type of business, location, and other business model factors.

Figure 5:
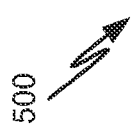
FIG. 5 is a table for attribute aggregation and analysis for the predictive model for abandoned calls in accordance with embodiments of the present disclosure.

With reference now to FIG. 5, a table for attribute aggregation and analysis for the predictive model for abandoned calls 500 is presented in accordance with embodiments of the present disclosure. FIG. 5 contains a first column Contact 504, a second column Region 508, a third column Customer Class 512, a fourth column Transaction Type 516, a fifth column Probability of Waiting>5 minutes P(Wait>5) 520, a sixth column Probability of Waiting<5 minutes P(Wait≤5) 524, a seventh column Probability of Abandon P(Abandon) 528, an eighth column Risk of Abandon ($) 532, a ninth column Risk of Wait ($) 536, and a tenth column Total Risk ($) 540.

Given the output of the models for waiting, abandoning, and cost from the context store 132 and the model store 212, the prediction engine 216 calculates the probability of abandon, the risk of abandon (expected cost), the risk of wait, and the total risk, as follows:

$$P(\text{Abandon}) = P(\text{Wait}>5) \times P(\text{Abandon}|\text{Wait}>5) + P(\text{Wait}\leq5) \times P(\text{Abandon}|\text{Wait}\leq5)$$

$$\text{Risk of Abandon} = (\text{Cost of Abandon}) \times P(\text{Abandon})$$

$$\text{Risk of Wait} = (\text{Cost of Wait}>5) \times P(\text{Wait}>5) + (\text{Cost of Wait}\leq5) \times P(\text{Wait}\leq5)$$

$$\text{Total Risk} = (\text{Risk of Abandon}) + (\text{Risk of Wait})$$

Based on an aggregate analysis shown in FIG. 5, the communication system 100 predicts that Contact 3, a Platinum Sales customer from the Southwest, has a particularly high total risk (85.2) to abandon. The work assignment engine 120 may receive an alert and immediately assign Contact 3 to an available agent, earlier than the work assignment engine 120 would have based only on one or more attributes and/or queue position. The communication system 100 can also alter wait treatment for Contact 3, offer a callback, and/or take other actions to mitigate the risk for Contact 3. The communication system 100 predicts that Contact 5, a Silver Support customer from the Midwest, has no total risk (0) to abandon. The work assignment engine 120 would receive no alert for Contact 5, and Contact 5 would be processed using normal work assignment and matching methods.

The given description and non-limiting examples may be highly simplified. In practice, the predictions of wait time, patience, and cost can depend on other variables, and the predictions of wait time and patience can also include distributions, hazard rates, and other thresholds. All three prediction types can depend on time, and the risk calculations can involve calculating integrals of products of the predictions and/or combining the input predictions in additional ways.

Figure 6:
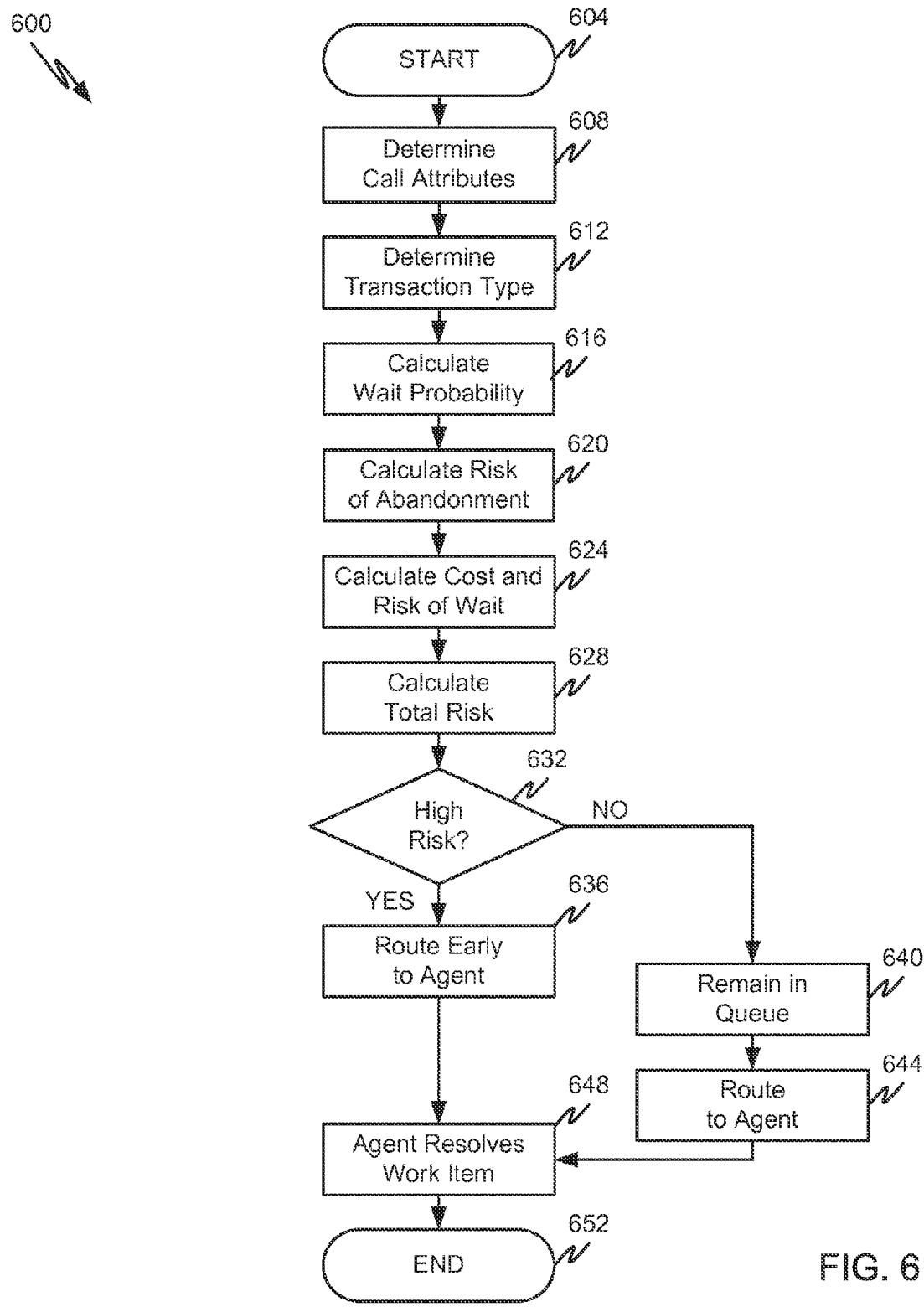
FIG. 6 is a flow diagram for a predictive model for abandoned calls in accordance with embodiments of the present disclosure.

With reference now to FIG. 6, aspects of a method 600 for a predictive model process for abandoned calls in accordance with embodiments of the present disclosure are depicted. Generally, the method 600 begins with a start operation 604 and terminates with an end operation 652. While a general order for the steps of the method 600 are shown in FIG. 6, the method 600 can include more or fewer steps or the order of the steps can be arranged differently than those shown in FIG. 6. The method 600 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 600 shall be explained with reference to the systems, components, modules, software, structures, etc. described in conjunction with FIGS. 1-5.

The method begins at step 604 and continues when a contact center customer initiates a call from a customer communication device 108 and the call is received at the contact center. Once the customer call is received and accepted, call attributes (e.g., customer class, geographical region) can be identified and/or retrieved from the CRM 124, in step 608. In step 612, a transaction type request (e.g., sales, support, other) and a customer identifier can be determined by an IVR 204 and an application that populates the context store 132 can capture the data. An ACD 208 may be queried to obtain the skill to which the customer call has been queued, which typically will correspond to the Customer Class (e.g., Silver, Gold, Platinum).

Different calls can have different costs associated with abandonment and with waiting. For example, having a Sales call abandon may incur a much higher cost (lost revenues) than having a Support call abandon. Also, even if a call does not abandon, there may be a cost associated with making a caller wait, in terms of loss of good will. When the work assignment engine 120 needs to know the estimated risk of abandon and wait, the consuming application can call the prediction engine 216 to calculate the risk and may reference other models from the model store.

In step 616, a wait probability may be determined by a query from a work assignment engine 120 to a database 128, based on call history by Transaction Type. In a simple example, a Sales call probability of waiting longer than five minutes P(Wait>5) may be 30%. The Sales call probability of waiting equal to or less than five minutes P(Wait≤5) may be 70%. A Support call probability of waiting five minutes P(Wait>5) may be 80%. The technical support call probability of waiting equal to or less than five minutes P(Wait≤5) may be 20%. Additional factors and attributes can also be included in a wait probability calculation.

In step 620, an abandon risk may be calculated when the work assignment engine 120 calls a prediction engine 216 to calculate the abandon risk for the customer call. The prediction engine 216 may calculate probability of abandonment of the customer call by Region and other contextual data, greater than five minutes P(Abandon|Wait>5) and less than five minutes P(Abandon|Wait≤5).

In step 624, Risk of Wait in dollars ($) may be calculated as Cost of Wait for greater than five minutes times the Probability of Wait for greater than five minutes plus the Cost of Wait for less than or equal to five minutes times the Probability of Wait for less than or equal to five minutes:

$$(\text{Cost of Wait}>5) \times P(\text{Wait}>5) + (\text{Cost of Wait} \leq 5) \times P(\text{Wait} \leq 5)$$

In step 628, total risk may be calculated based on customer attributes including context, history, Region, and Customer Class, Transaction Type, Wait probability, Abandon Probability, Risk of Abandonment, or Cost of Abandonment.

In step 632, the prediction engine 216 may determine whether or not a call is at risk for abandonment. If the answer to the question is that the call is high risk, the prediction engine 216 can send an alert to the work assignment engine 120 to route the call to an agent 112 immediately (step 636), rather than going through the normal method of having the call continue to wait in queue. Alternatively, if the answer to the question is that the call is not yet at risk of abandonment, the call can remain in queue with no special action taken (step 640). When the call moves to first in queue, the call can go into the normal resolution method, staring with the work assignment engine 120 routing the call to an agent (step 644). In either case, the work item for the routed call (early or normal) may be resolved by an agent, in step 648. In step 652, the method ends.

Though highlighted in the examples above that the work assignment engine 120 can change routing based on a predicted high total risk, the routing may or may not change depending on which agent or agents become available and how the work item compares to other work items at risk for abandonment.

It should be appreciated that while embodiments of the present disclosure have been described in connection with typical contact center architecture, embodiments of the present disclosure may apply to queue-based or queueless contact centers.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method, comprising:
receiving, by a microprocessor and via a network, a work item in a contact center, the work item being associated with a first customer and corresponding to a first contact in the contact center to be processed by a contact center agent, wherein the first contact is a first communication from a communication device of the first customer;
placing, by the microprocessor, the work item into a contact center queue;
determining, by the microprocessor, a wait tolerance of the work item, wherein the determined wait tolerance is based on a customer history for the first customer, wherein the customer history includes at least one abandonment of a second contact by the first customer along with a wait time prior to the at least one abandonment, and wherein the second contact is a second communication from the communication device of the first customer;
determining, by the microprocessor, an amount of time that the first customer has been waiting for service by the contact center;
based on a comparison of the determined wait tolerance and the determined amount of time that the first customer has been waiting for service by the contact center, determining, by the microprocessor, a risk of the first customer abandoning the first contact in the contact center queue; and
based on the determined risk, determining whether to keep the work item in the contact center queue or route the work item from the contact center queue to a communication device of an agent, out of order in the contact center queue, in an attempt to avoid the first customer abandoning the first contact.

2. The method of claim 1, wherein the work item is routed from the contact center queue to the communication device of the agent based on the determined risk.

3. The method of claim 1, wherein the risk is further determined based on a skill type for the work item.

4. The method of claim 3, wherein the risk is based on a communication channel used by the first customer for the first contact.

5. The method of claim 3, wherein the risk is based on a transaction type.

6. The method of claim 1, further comprising:
   determining, by the microprocessor, an estimated cost associated with the first customer abandoning the first contact;
   determining, by the microprocessor, an abandon risk based on the determined risk of the first customer abandoning the first contact coupled with the estimated cost associated with the first customer abandoning the first contact;
   determining, by the microprocessor, a risk of wait for the first customer; and
   comparing, by the microprocessor, the risk of wait with the determined abandon risk to determine whether to keep the work item in the contact center queue or route the work item to the communication device of the agent, out of order in the contact center queue, in an attempt to avoid the first customer abandoning the first contact.

7. The method of claim 6, wherein the risk of wait is calculated as a monetary value and compared with the abandon risk, which is also calculated as a monetary value.

8. A contact center comprising:
   a microprocessor; and
   a computer readable medium, coupled with the microprocessor and comprising microprocessor readable and executable instructions that program the microprocessor to:
      receive, via a network, a work item in the contact center, the work item being associated with a first customer and corresponding to a first contact in the contact center to be processed by a contact center agent, wherein the first contact is a communication from a communication device of the first customer;
      place the work item into a contact center queue;
      determine a wait tolerance of the work item, wherein the determined wait tolerance is based on a customer history for the first customer, wherein the customer history includes at least one abandonment of a second contact by the first customer along with a wait time prior to the at least one abandonment, and wherein the second contact is a second communication from the communication device of the first customer;
      determine an amount of time that the first customer has been waiting for service by the contact center;
      based on a comparison of the determined wait tolerance and the determined amount of time that the first customer has been waiting for service by the contact center, determine a risk of the first customer abandoning the first contact in the contact center queue; and
      instructions configured to, based on the determined risk, determine whether to keep the work item in the contact center queue or route the work item from the contact center queue to a communication device of an agent out of order in the contact center queue, in an attempt to avoid the first customer abandoning the first contact.

9. The contact center of claim 8, wherein the work item is routed from the contact center queue to the communication device of the agent based on the determined risk.

10. The contact center of claim 8, wherein the risk is further determined based on a skill type for the work item.

11. The contact center of claim 10, wherein the risk is based on a communication channel used by the first customer for the first contact.

12. The contact center of claim 10, wherein the risk is based on a transaction type.

13. The contact center of claim 8, further comprising microprocessor readable and executable instructions that program the microprocessor to:
   determine an estimated cost associated with the first customer abandoning the first contact;
   determine an abandon risk based on the determined risk of the first customer abandoning the first contact coupled with the estimated cost associated with the first customer abandoning the first contact;
   determine a risk of wait for the first customer; and
   compare the risk of wait with the determined abandon risk to determine whether to keep the work item in the contact center queue or route the work item to the communication device of the agent, out of order in the contact center queue, in an attempt to avoid the first customer abandoning the first contact.

14. The contact center of claim 13, wherein the risk of wait is calculated as a monetary value and compared with the abandon risk, which is also calculated as a monetary value.

15. A contact center, comprising:
   a microprocessor; and
   a computer readable medium, coupled with the microprocessor and comprising microprocessor readable and executable instructions that program the microprocessor to execute:
      a work assignment engine that receives a plurality of contacts from customers, generates, for each contact, a work item, and places the plurality of contacts into a contact center queue, wherein the plurality of contacts are communications from a plurality of customer communication devices;
      a routing engine that establishes a connection between one or more resources selected for processing a work item and a customer associated with the work item such that the one or more resources can communicate electronically with each customer associated with each work item; and
      a prediction engine that determines that a first customer associated with a first contact of the plurality of contacts in the contact center queue has a wait tolerance that is shorter than a wait tolerance of at least one other customer who is associated with a second contact enqueued in the contact center queue ahead of the first contact, wherein the first contact wait tolerance is based on a previous abandoned contact from the first customer and, in response to determining that the first customer has a wait tolerance shorter than the at least one other customer, instructs the work assignment engine to assign the first contact to a first resource prior to assigning the second contact to a second resource.

16. The contact center of claim 15, wherein the wait tolerance of the first customer is calculated based on a transaction type of the first contact.

17. The contact center of claim 16, wherein the wait tolerance of the first customer is also calculated based on a geographic region in which the first customer is situated.

18. The contact center of claim 17, wherein the wait tolerance of the first customer is also calculated based on historical abandonment statistics for the geographic region and wherein the at least one other customer is situated in a different geographic region than the first customer that has a lower abandonment percentage than the geographic region in which the first customer is situated.

19. The contact center of claim 18, wherein the prediction engine determines a risk associated with the first customer abandoning the first contact and compares the determined risk with a risk of waiting to assign the first customer to a contact after the at least one other customer has been assigned to a resource.

20. The contact center of claim 19, wherein the prediction engine calculates a risk associated with different contact types in the contact center.

* * * * *

UNITED STATES PATENT AND TRADEMARK OFFICE
CERTIFICATE OF CORRECTION

PATENT NO. : 9,609,133 B2
APPLICATION NO. : 14/673515
DATED : March 28, 2017
INVENTOR(S) : Shmuel Shaffer et al.

It is certified that error appears in the above-identified patent and that said Letters Patent is hereby corrected as shown below:

At Column 13, Line 65, please delete "instructions configured to," therein.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*